(12) United States Patent
Sato et al.

(10) Patent No.: US 8,901,781 B2
(45) Date of Patent: Dec. 2, 2014

(54) PREVENTION OF THE PROPAGATION OF POWER SUPPLY NOISE FROM ONE OUTPUT CIRCUIT TO ANOTHER IN A SEMICONDUCTOR DEVICE

(75) Inventors: Takenori Sato, Tokyo (JP); Hiroki Fujisawa, Tokyo (JP)

(73) Assignee: PS4 Luxco S.A.R.L., Luxembourg (LU)

( * ) Notice: Subject to any disclaimer, the term of this patent is extended or adjusted under 35 U.S.C. 154(b) by 912 days.

(21) Appl. No.: 12/453,772

(22) Filed: May 21, 2009

(65) Prior Publication Data

US 2009/0289499 A1 Nov. 26, 2009

(30) Foreign Application Priority Data

May 22, 2008 (JP) .................................. 2008-134151

(51) Int. Cl.
*H01B 7/30* (2006.01)
*H02J 1/00* (2006.01)

(52) U.S. Cl.
CPC ....................................... *H02J 1/00* (2013.01)
USPC ........................................................ 307/147

(58) Field of Classification Search
USPC ...................... 307/147; 257/773, 697; 361/56
See application file for complete search history.

(56) References Cited

U.S. PATENT DOCUMENTS

| | | | |
|---|---|---|---|
| 6,677,781 B2 * | 1/2004 | Ishikawa et al. | 326/82 |
| 6,850,397 B2 * | 2/2005 | Russ et al. | 361/91.8 |
| 6,928,632 B2 | 8/2005 | Wachi | |
| 7,391,113 B2 | 6/2008 | Isa et al. | |
| 7,541,840 B2 * | 6/2009 | Jeon et al. | 326/83 |
| 7,569,428 B2 | 8/2009 | Isa et al. | |
| 7,956,470 B2 | 6/2011 | Isa et al. | |
| 2006/0244101 A1 * | 11/2006 | Uematsu et al. | 257/533 |
| 2007/0069362 A1 * | 3/2007 | Isa et al. | 257/697 |
| 2008/0137245 A1 * | 6/2008 | Hiraoka | 361/56 |

FOREIGN PATENT DOCUMENTS

| | | |
|---|---|---|
| JP | H03-270067 A | 12/1991 |
| JP | H04-111350 A | 4/1992 |
| JP | 11-163032 | 6/1999 |
| JP | 2002-373940 A | 12/2002 |
| JP | 2003-152081 A | 5/2003 |
| JP | 2006-278805 A | 10/2006 |
| JP | 2007-095911 A | 4/2007 |
| JP | 2007-095970 A | 4/2007 |

* cited by examiner

*Primary Examiner* — Daniel Cavallari
(74) *Attorney, Agent, or Firm* — McGinn IP Law Group, PLLC

(57) ABSTRACT

A semiconductor device is disclosed. A first power supply wiring for connecting between a first output circuit consisting of a predetermined number of output circuits and a first power supply pad which corresponds to the first output circuit, is connected via a resistor with a second power supply wiring for connecting between a second output circuit consisting of a predetermined number of output circuit and a second power supply pad which corresponds to the second output circuit. Thus, power supply noise that is to be propagated to certain output circuits via in-chip output power supply wirings can be reduced.

22 Claims, 16 Drawing Sheets

PREVENTION OF THE PROPAGATION OF POWER SUPPLY NOISE FROM ONE OUTPUT CIRCUIT TO ANOTHER IN A SEMICONDUCTOR DEVICE

BACKGROUND OF THE INVENTION

1. Field of the Invention

The present invention relates to a semiconductor device comprising: a chip including individually independent power supply wirings for providing power supply voltage to a plurality of output circuits, and power supply pads each connected to the power supply wiring; a substrate on which the chip is to be mounted and including a plurality of external power supply terminals, each of which is to be connected with each of the power supply pad.

2. Description of Related Art

FIG. 1 is a schematic diagram of a semiconductor chip. Semiconductor chip 2 is mounted on substrate 1 and has center pad 3 on its the central part. A multitude of balls 4 are disposed on substrate 1 at both sides of center pad 3. Center pad 3 of semiconductor chip 2 is connected to solid wirings (not shown) etc. of substrate 1. The connection from center pad 3 of semiconductor chip 2 to the solid wirings of substrate 1 is performed through a bonding process or by lead wires. The solid wirings on substrate 1 are connected to balls 4. Balls 4 that correspond to respective signals and power supplies are determined by a standard such as JEDEC (Joint Electronic Device-Electronic Industrial Association).

FIG. 2 is a detailed view of portion 5 in FIG. 1 of semiconductor chip 2; and FIG. 3 is an enlarged view of FIG. 2. DQ output circuit 11, DQS output circuit 12, DQSB output circuit 13, compensation capacity 14, and ESD (Electrostatic Discharge) element 15 are connected with in-chip output VDDQ power supply wiring 16 and in-chip output VSSQ power supply wiring 17, which are lower resistance wirings. DQ output circuit 11 is a circuit for outputting output signal DQ. DQS output circuit 12 is a circuit for outputting data strobe signal DQS. DQSB output circuit 13 is a circuit for outputting data strobe signal DQSB which is an inverted signal of data strobe signal DQS. Data strobe signals DQS and DQSB function as a reference clock for output signal DQ. That is, data strobe signals DQS and DQSB are complementary signals. A data strobe output circuit comprised of the DQS output circuit and the DQSB output circuit is an output circuit for outputting the complementary signals. Compensation capacity 14 serves to suppress fluctuations of the voltages in in-chip output VDDQ power supply wiring 16 and in in-chip output VSSQ power supply wiring 17. ESD element 15 is an element for electrostatic protection. In-chip output VDDQ power supply wiring 16 and in-chip output VSSQ power supply wiring 17 are wirings each providing high-level power supply voltage VDDQ and low-level power supply voltage VSSQ to DQ output circuit 11, DQS output circuit 12, and DQSB output circuit 13. DQ output circuit 11, DQS output circuit 12 and DQSB output circuit 13 have output signal lines that are connected to respective output circuit pads 21, 22, and 23, and are further connected to the corresponding solid wirings on substrate 1. Although not shown in the FIGS. 2 and 3, the solid wiring is connected to corresponding ball 4 on substrate 1. In-chip output VDDQ power supply wiring 16 is connected to power supply pads 24a to 24e on chip 2, and in-chip output VSSQ power supply wiring 17 is connected to power supply pads 25a to 25e on chip 2. Connections from power supply pads 24a, 24b, 24c, 24d, and 24e to respective VDDQ supply balls 31, 42, 42, 42 and 34 on substrate 1, and connections from power supply pads 25a, 25b, 25c, 25d, and 25e to respective VSSQ power supply balls 41, 32, 32, 43, and 43 on substrate 1 are performed through bonding (a broken lines in FIGS. 2 and 3) etc. between these power supply pads and the solid wirings on substrate 1. To be precise, the wirings (broken lines in FIGS. 2 and 3) that extend on the substrate from the power supply balls disposed on substrate 1 are metallized wirings and the wirings (broken lines in FIGS. 2 and 3) on center pad 3 are bonding wires. The solid wirings are connected to VDDQ power supply balls 31, 34, and 42 and VSSQ power supply balls 32, 41, and 43 on substrate 1. Power supply voltage VDDQ is supplied from VDDQ power supply balls 31, 34, and 42 to DQ output circuit 11, DQS output circuit 12, and DQSB output circuit 13 through VDDQ power supply pads 24a to 24e and in-chip output VDDQ power supply wiring 16. Power supply voltage VSSQ is supplied from VSSQ power supply balls 32, 41, and 43 to DQ output circuit 11, DQS output circuit 12, and DQSB output circuit 13 through VSSQ power supply pads 25a to 25e and in-chip output VSSQ power supply wiring 17. It is to be noted that although signal wirings from output circuit pads 21, 22, and 23 of respective DQ output circuit 11, DQS output circuit 12, and DQSB output circuit 13 are also connected with balls 4 on substrate 1, the illustration of the signal wirings is omitted in FIGS. 2 and 3.

FIG. 4 illustrates circuit diagrams of DQ output circuit 11, DQS output circuit 12, and DQSB output circuit 13. In FIG. 4, although only the configuration of DQS output circuit 12 is shown, DQSB output circuit 13 and DQ output circuit 11 have similar configurations to that of DQS output circuit 12. DQ output circuits 11 take in data Data<n>R and Data<n>F stored in memory (not shown) in synchronization with clock LCLKOE and serially outputs data signals DQ0, DQ1, ..., DQn from internally operating power supplies VDD and VSS as external output power supplies VDDQ and VSSQ. In this case, data Data<n>R is output in synchronization with the rise of clock LCLKOE and Data<n>F is output in synchronization with the fall of clock LCLKOE. Signals DQS and DQSB are generated by a circuit (not shown) in response to a read command from the outside, and are output from DQS output circuit 12 and DQSB output circuit 13, respectively. Signals DQSB and DQS have opposite phases. Although DQ output circuit 11, DQS output circuit 12, and DQSB output circuit 13 have the same configuration, a skew in input timing of clock LCLKOE is generated due to the difference in the positions of the circuits, which causes a timing difference (tDQSQ) of clock LCLKOE (FIG. 5A). In FIG. 4, since the timing at which clock LCLKOE is input into DQS circuit 12 and DQSB output circuit 13 is later than the timing at which it is input into DQ output circuit 11, the timing difference (tDQSQ) of output signals DQS and DQSB with respect to output signal DQ1 is at a maximum.

The reason why power supply noise is generated will be described with reference to waveform diagrams of output signals DQ, DQS, and DQSB shown in FIGS. 5A and 5B. While output signals DQS and DQSB always operate in opposite phases, output signal DQ changes depending on the data pattern. When the data patterns of output signals DQ do not change, power supply noise will not be generated in output circuits 11, 12, and 13. For example, when the patterns of output signals DQ change from a high level to a low level all together (FIG. 5A), power supply voltage VSSQ rises. At this time, DQS output circuit 12 and DQSB output circuit 13 operate with a time delay of tDQSQ from output circuit 11 that outputs DQ1 due to the positional relationships of output circuits 12 and 13 with respect to output circuit 11. For this reason, under the influence of the power supply noise due to the rise of power supply voltage VSSQ, a delay in the fall of output signal DQSB that is in phase with output signal DQ takes place resulting in an increase of the value of Vox. Conversely, when output signals DQ change from a low level to a high level, power supply noise is also generated due to the fall of power supply voltage VDDQ and the value of Vox is decreased due to the high level power supply voltage. Vox is an electric potential when output signals DQS and DQSB cross each other. An ideal value of Vox is (VDDQ−VSSQ)/2. The value of Vox has a range that is determined by a standard, and a value outside that range is problematic.

FIGS. 6 and 7 show paths along which power supply noise propagates. FIG. 6 illustrates the manner in which the power supply noise generated in output circuit 11 for outputting DQ1 (indicated by a star mark in FIGS. 6 and 7) propagates to DQS output circuit 12 and DQSB output circuit 13 via in-chip output VDDQ power supply wiring 16 and in-chip output VSSQ power supply wiring 17. Since in-chip output VDDQ power supply wiring 16 and in-chip output VSSQ power supply wiring 17 are made of a low resistance wire, power supply noise readily propagates to DQS output circuit 12 and DQSB output circuit 13 via in-chip output VDDQ power supply wiring 16 and in-chip output VSSQ power supply wiring 17. FIG. 7 illustrates the manner in which the power supply noise generated in output circuit 11 for outputting DQ1 propagates by way of the wires on substrate 1. Since DQS output circuit 12, DQSB output circuit 13 and DQ output circuit 11 have VSSQ power supply pads (25*b* and 25*c*) in common, power supply noise propagates from DQ output circuit 11 to DQS output circuit 12 and DQSB output circuit 13 via the wires and VSSQ power supply pads 25*b* and 25*c*. Specifically, in center pad 3 (surrounded by the broken line in FIGS. 6 and 7) and near the boundary between substrate 1 and center pad region 3, there are two bonding wires that are branched from the metallized wiring on substrate 1 and that are connected to respective VSSQ power supply pads (25*b* and 25*c*). Even if the VSSQ power supply ball has the capability to absorb noise, shorting or branching power supply lines in the vicinity of respective VSSQ power supply pads (25*b* and 25*c*) can result in the sharing of a low impedance noise at the vicinities of the circuit which is a noise source. The fact that the lengths of metallized wirings on substrate 1 are longer than the length of bonded wires is also a factor that explains why the above described phenomenon is accelerated.

As described above, there are two paths along which power supply noise generated by DQ output circuit 11 propagates to DQS output circuit 12 and DQSB output circuit 13.

JP11-163032A discloses, regarding a method of separating power supplies for circuit blocks in a semiconductor memory, a technique of searching for an optimum combination from among multiple combinations of the circuit blocks, but it fails to describe a configuration for reducing the generated power supply noise.

SUMMARY

The present invention seeks to solve one or more of the above problems.

A first power supply wiring for connecting between a first output circuit consisting of a predetermined number of output circuits and a first power supply pad which corresponds to the first output circuit, is connected via a resistor with a second power supply wiring for connecting between a second output circuit consisting of a predetermined number of output circuit and a second power supply pad which corresponds to the second output circuit.

Since the first power supply wiring and the second power supply wiring are thus separated from each other, power supply noise that is to be propagated to certain output circuits via in-chip output power supply wirings can be reduced.

Further, a first wiring for connecting the first power supply pad and one of the external power supply terminals (power supply balls) with each other; and a second wiring for connecting the second power supply pad and the one external power supply terminal with each other are connected together in the vicinity of the one external power supply terminal.

Since the first wiring on the substrate to be connected to the first power supply pad and the second wiring on the substrate to be connected to the second power supply pad are connected with each other in the vicinity of one external power supply terminal, power supply noise that propagates via the wires of the substrate can be absorbed by a power supply. Connecting each wiring on the substrate corresponding to a power supply wiring on a semiconductor chip which is a noise source, not to the side closer to the semiconductor chip, but to the side farther from the semiconductor chip, where the parasitic capacity of the terminal is at maximum and the distance from the noise source is largest, will create synergistic effects to further reduce the noise of the power supply wiring in the semiconductor chip that is separated by the aforementioned resistor.

By reducing power supply noise that will be propagated from different output circuits, it is possible to prevent a delay which occurs at the rise or the fall of the output signal of an output circuit to thereby improve the AC characteristics.

BRIEF DESCRIPTION OF THE DRAWINGS

The above and other objects, features and advantages of the present invention will become more apparent from the following description of certain preferred embodiments taken in conjunction with the accompanying drawings, in which.

DETAIL DESCRIPTION OF THE PREFERRED EMBODIMENTS

First Exemplary Embodiment

Figure 1:
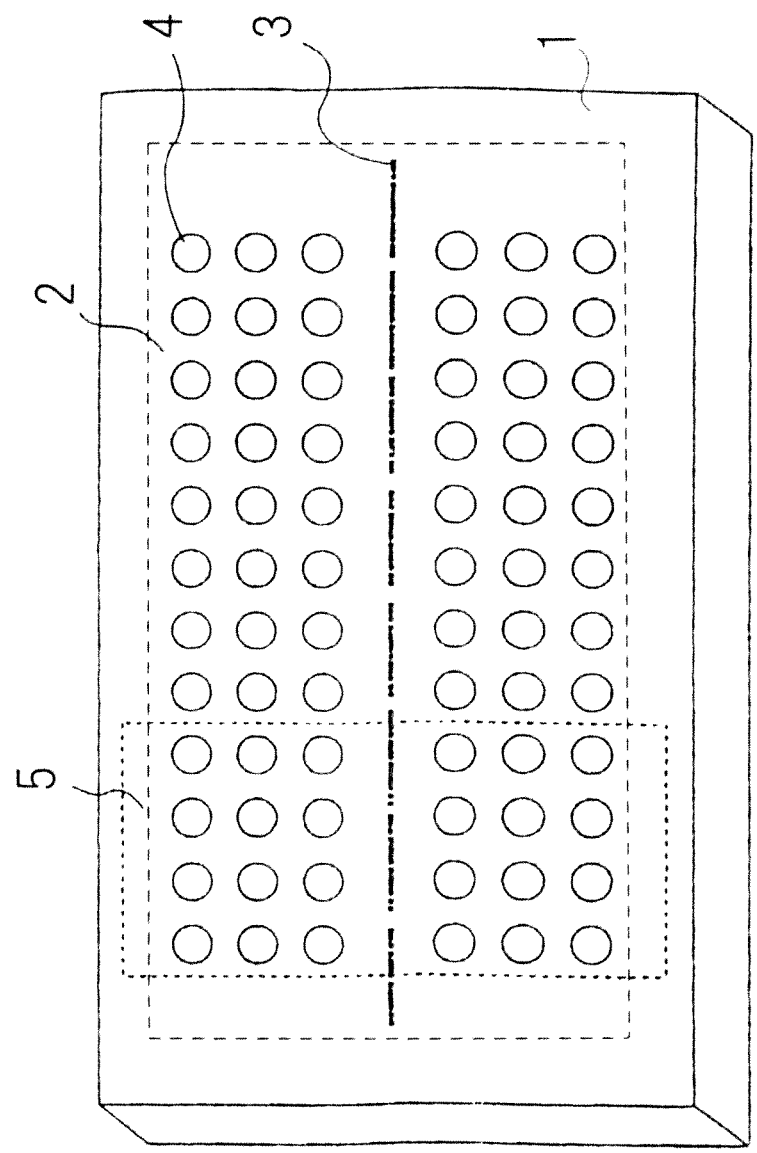
FIG. 1 is a schematic diagram of a semiconductor chip.
Figure 2:
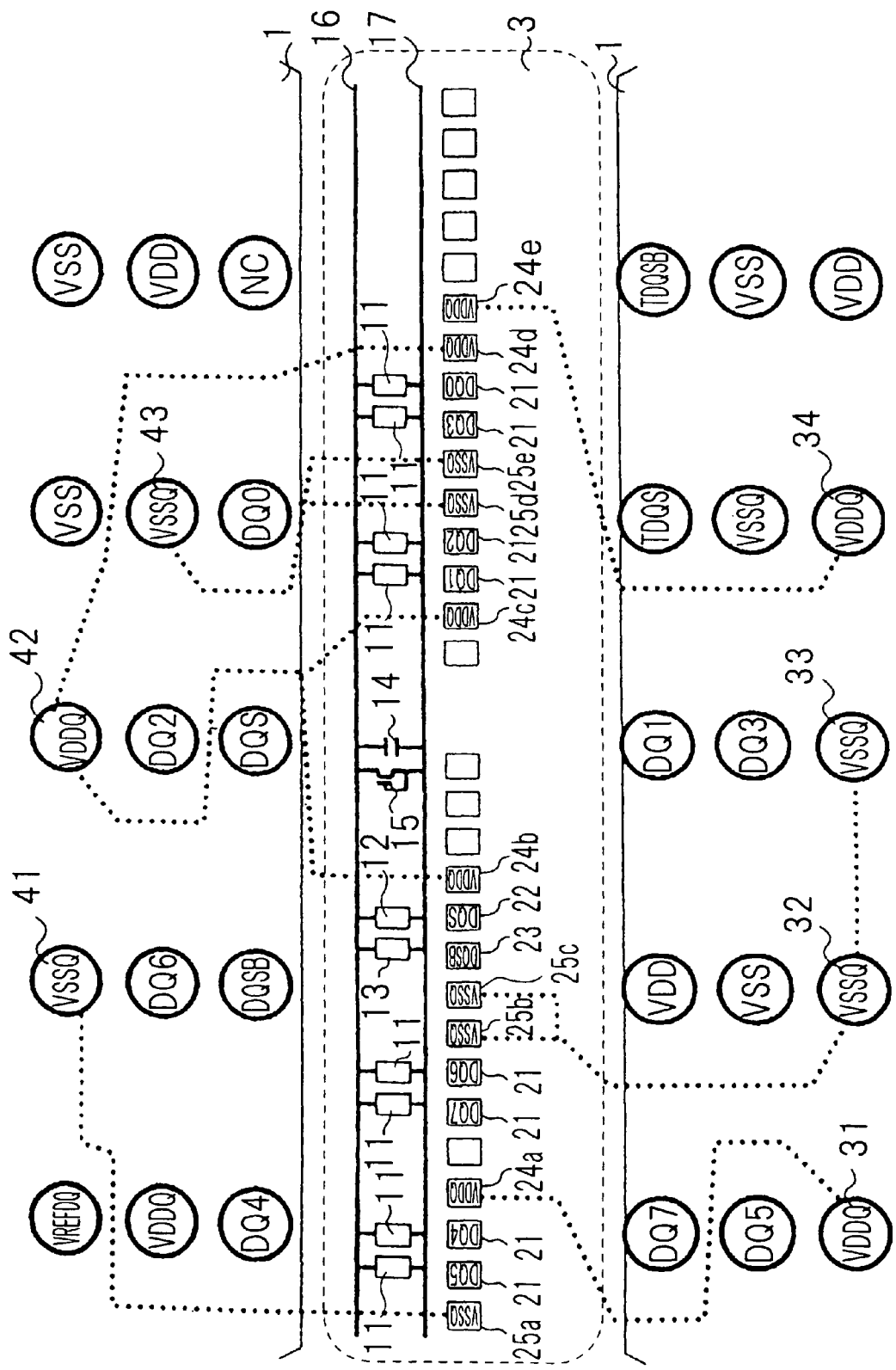
FIG. 2 is a detailed view of part 5 of semiconductor chip 2 in FIG. 1.
Figure 3:
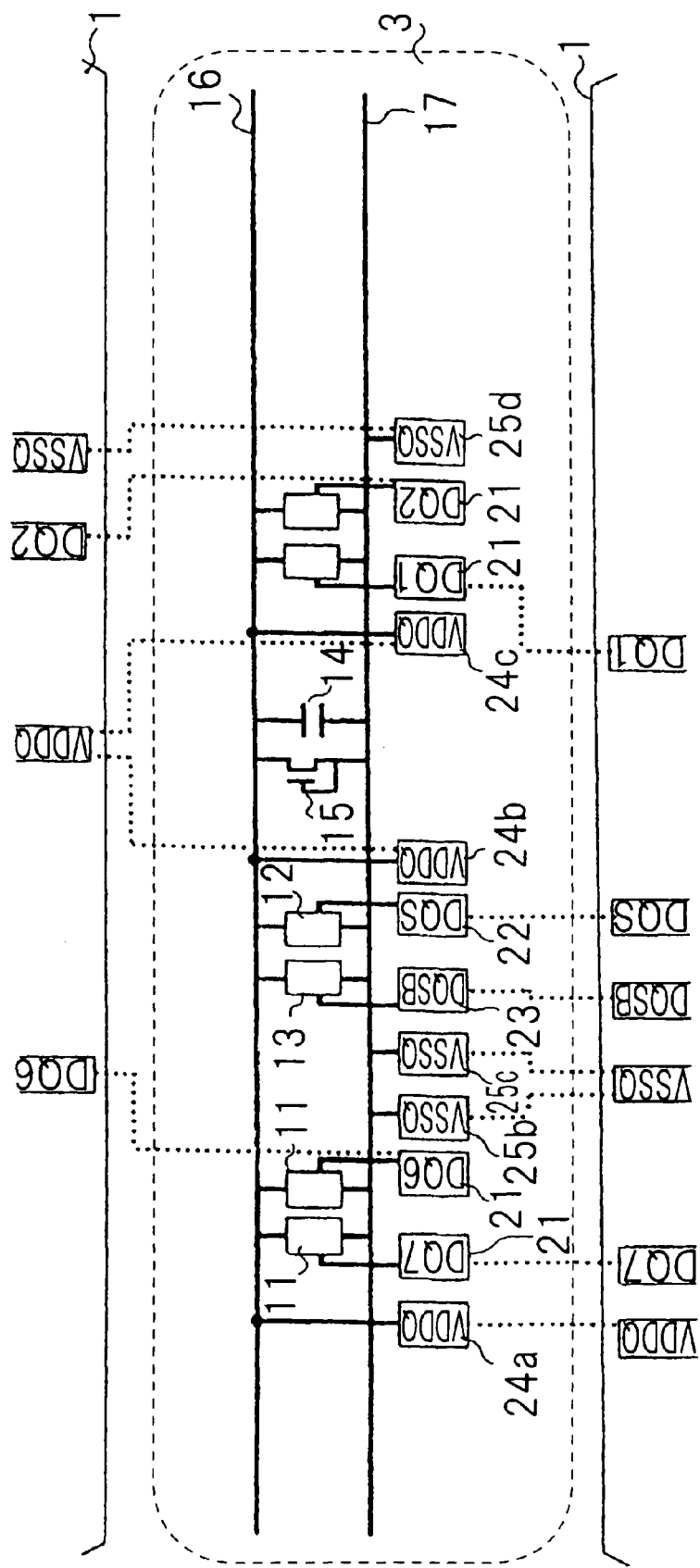
FIG. 3 is an enlarged view of FIG. 2.
Figure 4:
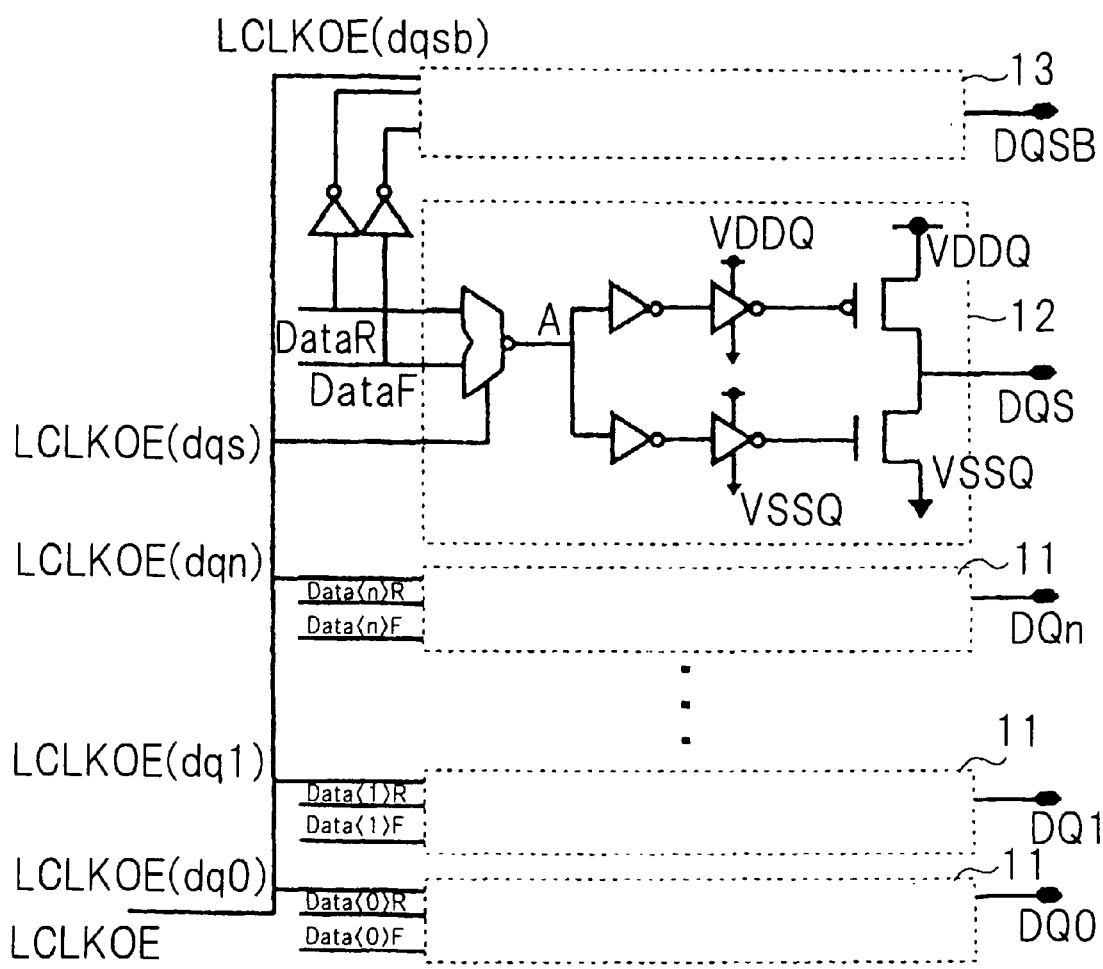
FIG. 4 is a detail view of a DQ output circuit.
Figure 5A:
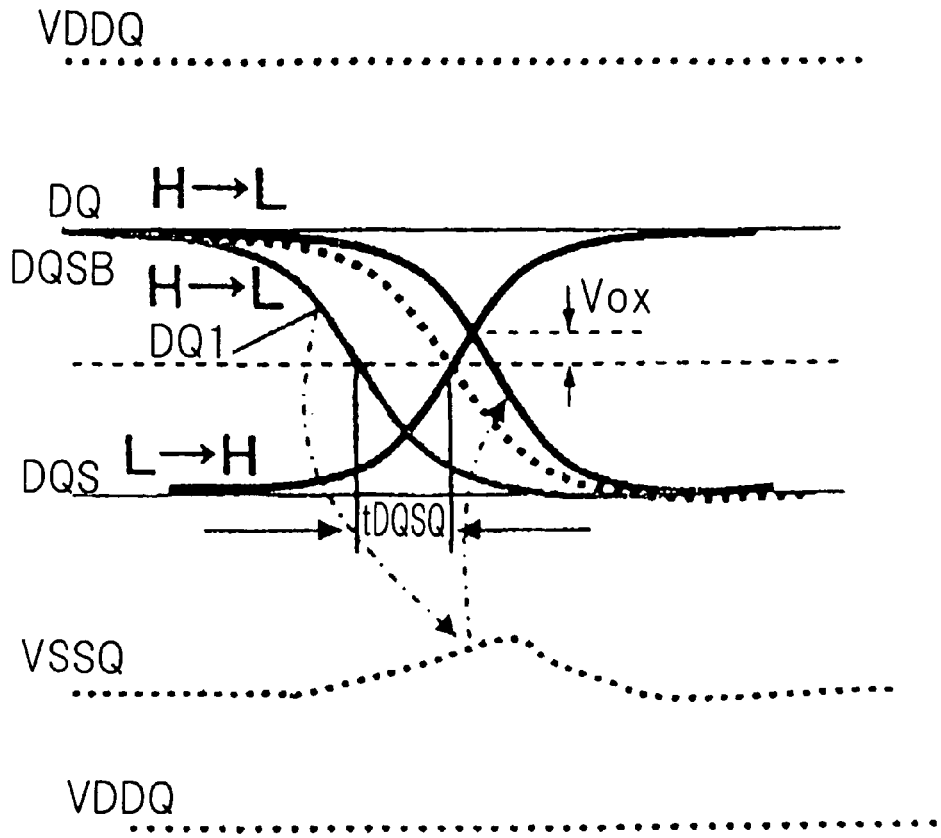
FIG. 5A is a waveform diagram of output signals DQ, DQS, and DQSB.
Figure 5B:
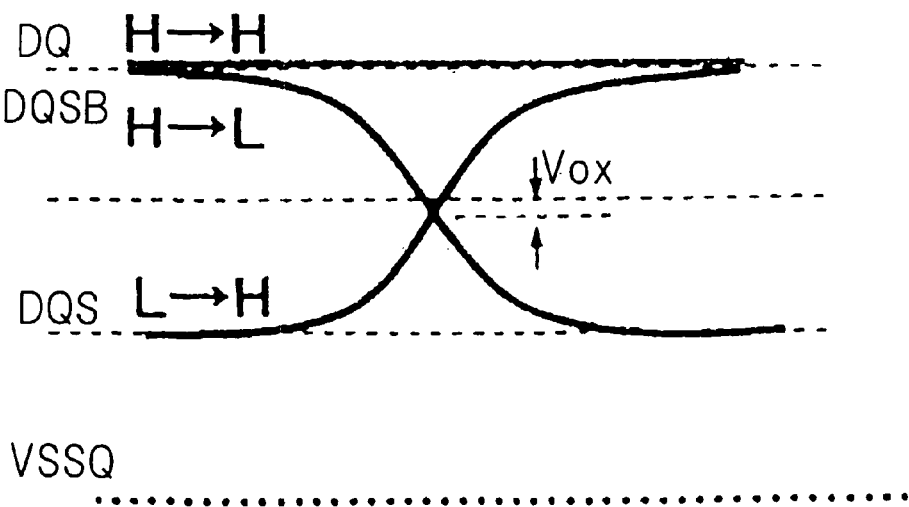
FIG. 5B is a waveform diagram of output signals DQ, DQS, and DQSB.
Figure 6:
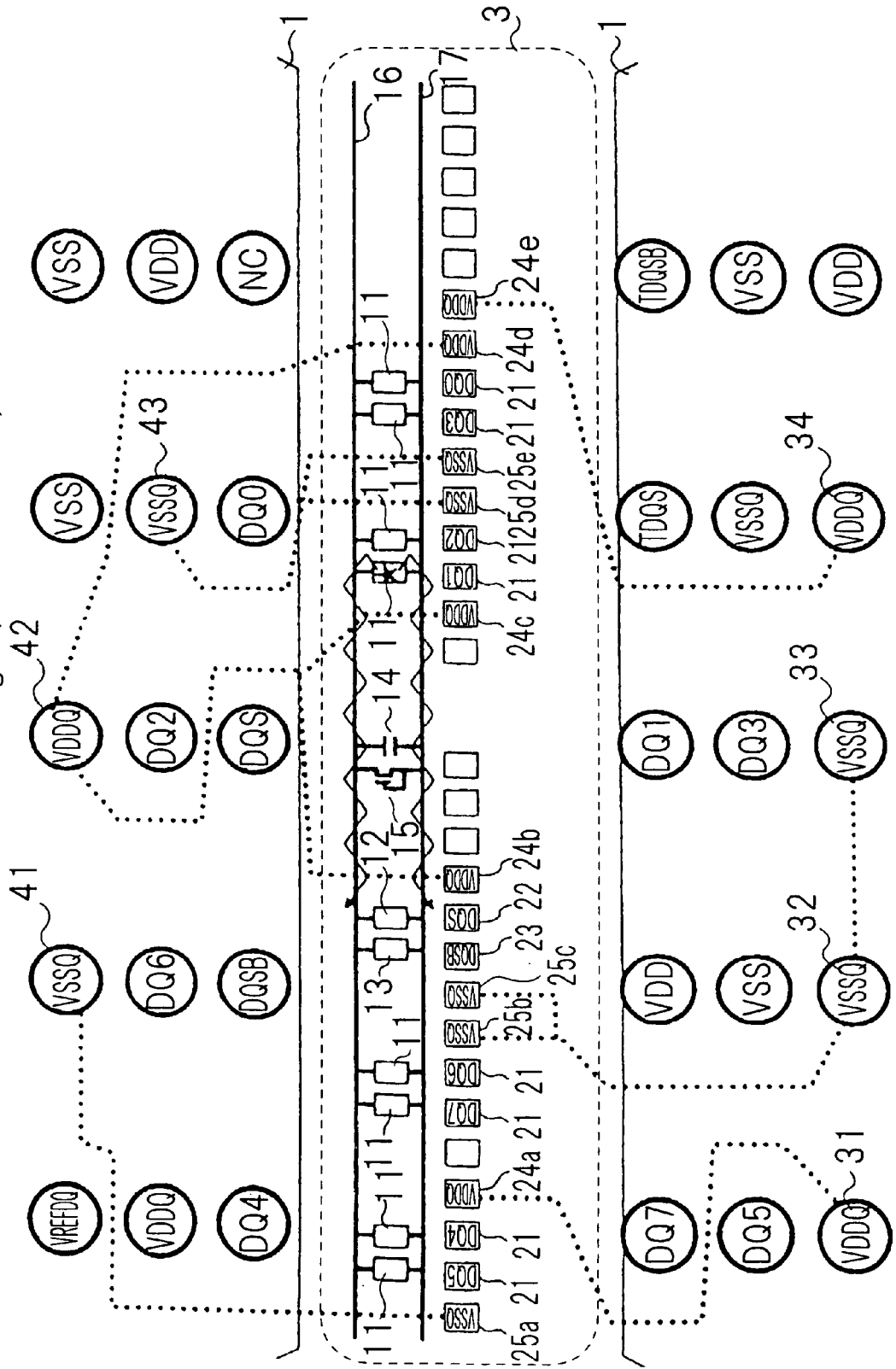
FIG. 6 shows paths (by way of low resistance wiring) along which power supply noise propagates.
Figure 7:
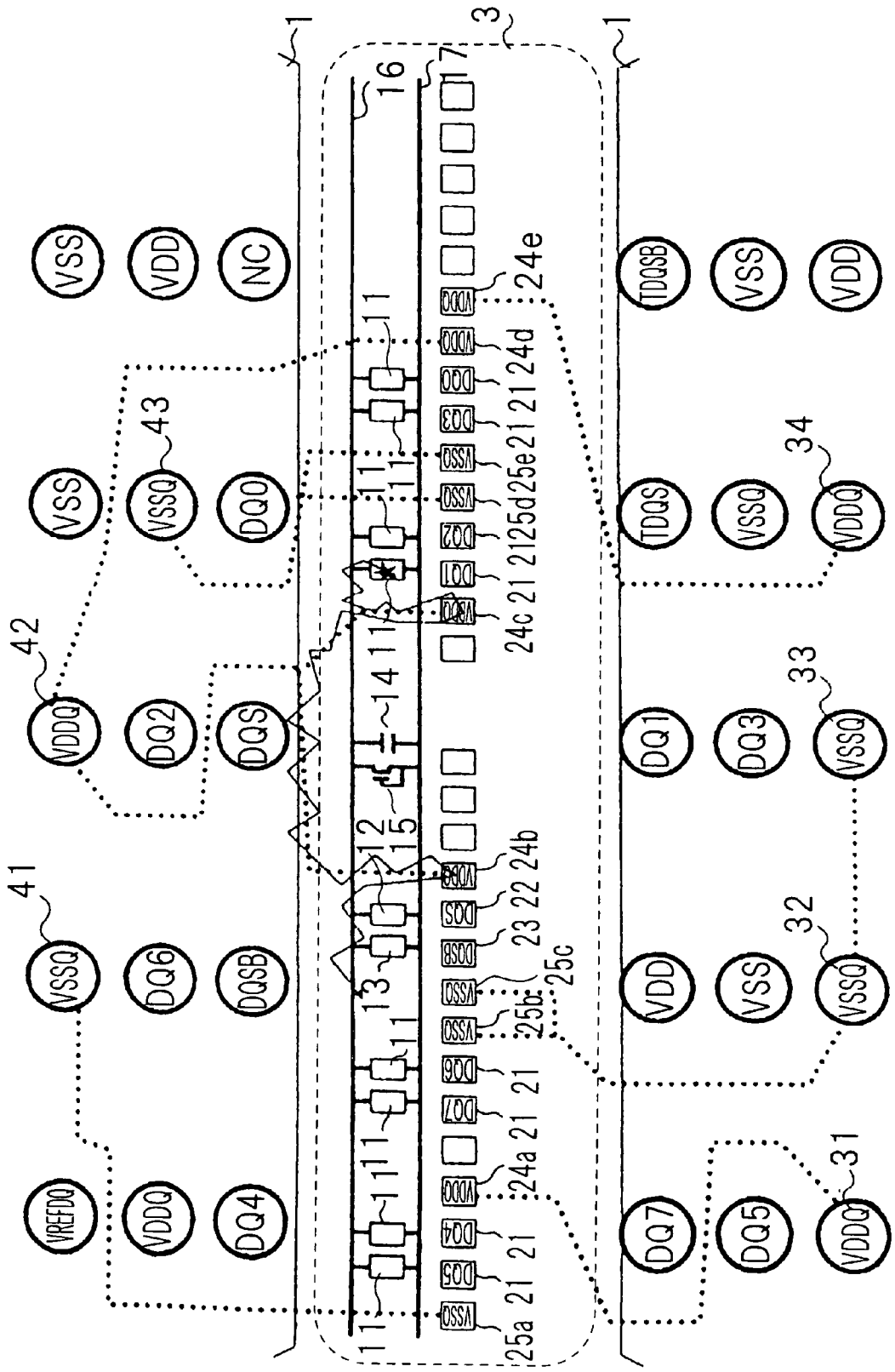
FIG. 7 shows paths (by way of package wiring) along which power supply noise propagates.
Figure 8:
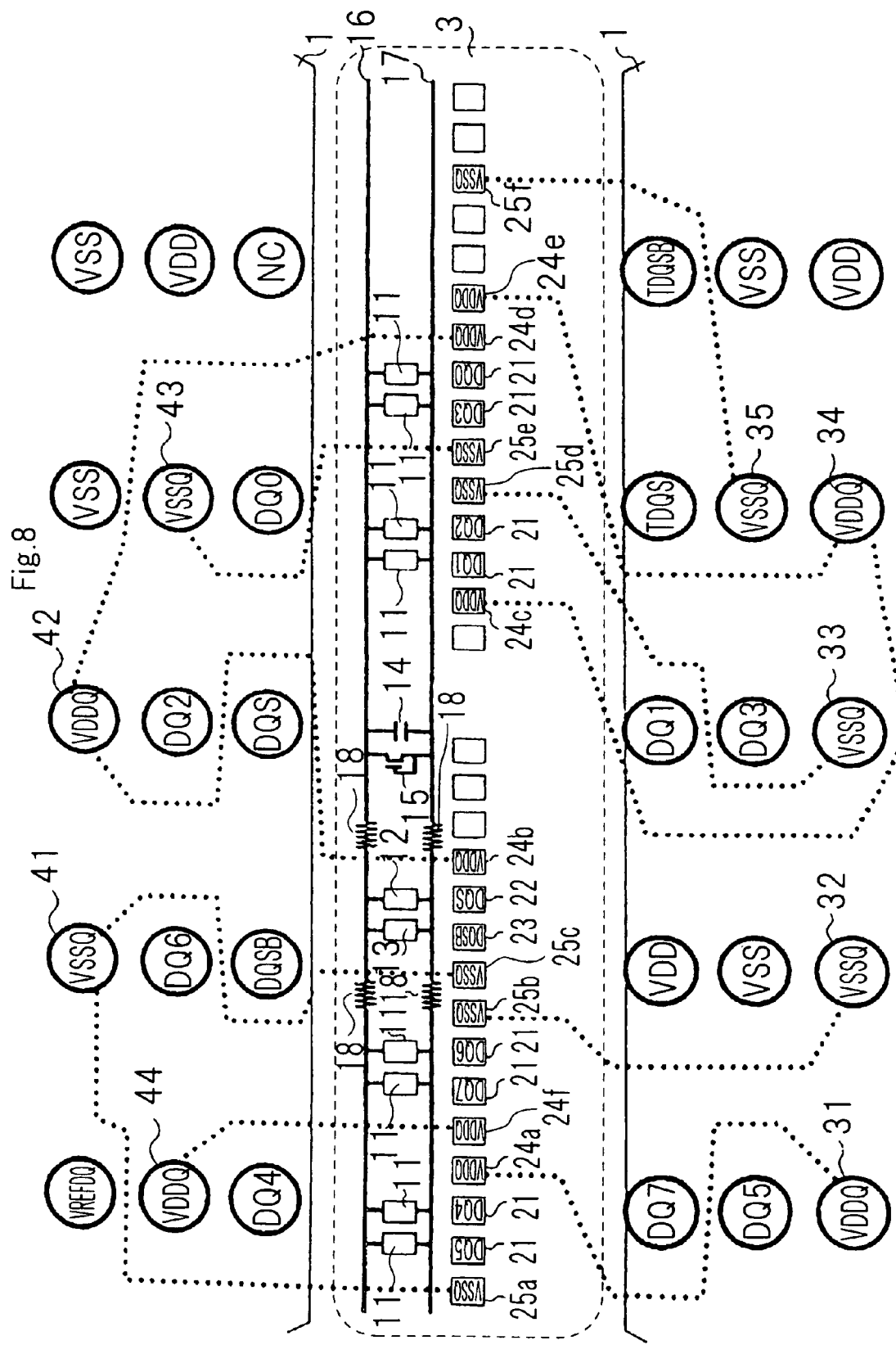
FIG. 8 shows a semiconductor device according to a first exemplary embodiment of the present invention.
Figure 9:
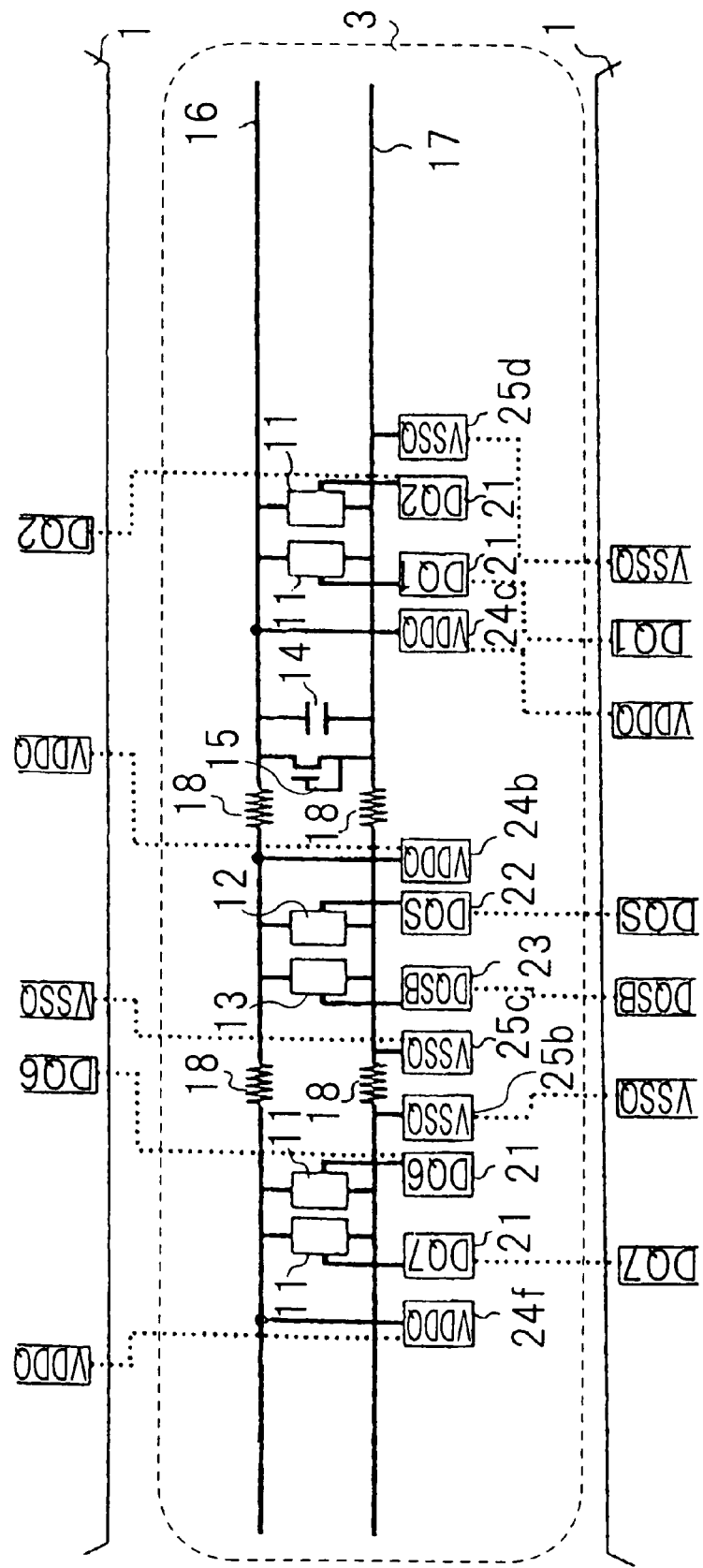
FIG. 9 is an enlarged view of the center pad area in FIG. 8.

FIG. 8 illustrates a semiconductor device according to a first exemplary embodiment of the present invention, and FIG. 9 is an enlarged view of FIG. 8. In FIGS. 8 and 9, the same numerical designations as were used in FIGS. 1 and 2 are used to designate same elements.

In the present exemplary embodiment, VDDQ power supply pad 24f is newly provided and is connected to VDDQ power supply ball 44, VSSQ power supply pad 25c is connected to VSSQ power supply ball 41, VDDQ power supply pad 24c is connected to VDDQ power supply ball 34, and VSSQ power supply pad 25d is connected to VSSQ power supply ball 33. As a result, for the combination of DQS output circuit 12 and DQSB output circuit 13, VDDQ power supply pad 24b and VSSQ power supply pad 25c are provided, and for adjacent two DQ output circuits 11, pairs of VDDQ and VSSQ power supply pads (24a and 25a, 24f and 25b, 24c and 25d, and 24d and 25e) are provided. Further, in the present exemplary embodiment, resistor 18 is provided in in-chip output VDDQ power supply wiring 16 and in-chip output VSSQ power supply wiring 17 between VDDQ power supply pad 24b which is provided for DQS output circuit 12, and VDDQ power supply pad 24c which is adjacent to VDDQ power supply pad 24b, and between VSSQ power supply pad 25c, which is provided for DQS output circuit 13, and VSSQ power supply pad 25b which is adjacent to VSSQ power supply pad 25c. This resistor 18 has the capability to reduce power supply noise which propagates through in-chip output VDDQ power supply wiring 16 and in-chip output VSSQ power supply wiring 17. Here, the resistance value of resistor 18 is not particularly limited, provided that it is sufficient to achieve its purpose, but the resistance value preferably be around some tens to hundreds of ohms. A tungsten resistor is typically used as such a resistor, but the material of the resistor is not particularly limited to tungsten.

The wirings (broken lines in FIGS. 8 and 9) on the substrate, which correspond to respective VDDQ power supply pads 24b and 24d to be connected to VDDQ power supply ball 42, are not connected with each other before they reach the vicinity of one VDDQ power supply ball (VDDQ power supply ball 42). The wirings (broken lines in FIGS. 8 and 9) on the substrate, which correspond to respective VSSQ power supply pads 25a and 25c to be connected to one VSSQ power supply ball 41, are not connected with each other before they reach the vicinity of one VDDQ power supply ball (VDDQ power supply ball By connecting wirings on the substrate with each other in the vicinity of one power supply ball to which the wirings are connected, although the noise in one of the power supply wirings in the semiconductor chip, which are separated by the resistor, propagates to the power supply ball via the wirings on the substrate, parasitic capacities etc. of the power supply line on the system board (mother board) onto which the semiconductor device is mounted, and which is an external terminal (power supply ball) of the semiconductor device, help to absorb and reduce the noise in the semiconductor chip that is propagated to the power supply ball. In contrast to the prior art in which the above mentioned wirings are connected with each other in center pad 3 on the semiconductor device, the pattern layout on the substrate according to the present invention, in which the above mentioned wirings are connected with each other in the vicinity of a power supply ball, further reduces the noise in either of the power supply wirings separated by the resistor in the semiconductor chip, and prevents the noise in one power supply wiring from leaking to the other power supply wiring separated by the resistor in the semiconductor chip.

It is to be noted that the connection in the vicinity of a power supply ball (vicinity of an external power supply terminal) refers to the connection that is made within the region of a predetermined distance from the center of the power supply ball, for example, the distance being an interval with which power supply balls are disposed. When the substrate is a well-known multi-layer substrate made up of multi-layer wiring layers and multi-layer insulation layers, the connection in the vicinity of a power supply ball refers to the connection of the power supply ball within the region of a via contact part which vertically passes through the multi-layer substrate. What is important is that the wirings should not be connected with each other in a wire-bonded region or in a corresponding region in other technologies (for example, TAB [Tape Automated Bonding]), where connection of electric signals is performed from the wiring on the substrate to power supply pads on the semiconductor chip, which are power supply noise sources. A person skilled in the art will readily understand this.

It is also to be noted that the wirings (broken lines in FIGS. 8 and 9) on the substrate are well-known metallized metal-wiring layers. The metallized wiring is made of a metal material consisting mainly of at least one of tungsten, molybdenum, manganese, and copper, such as, for example, tungsten, molybdenum, molybdenum/manganese, tungsten/copper, molybdenum/copper, tungsten/molybdenum/copper, and the like.

Figure 10:
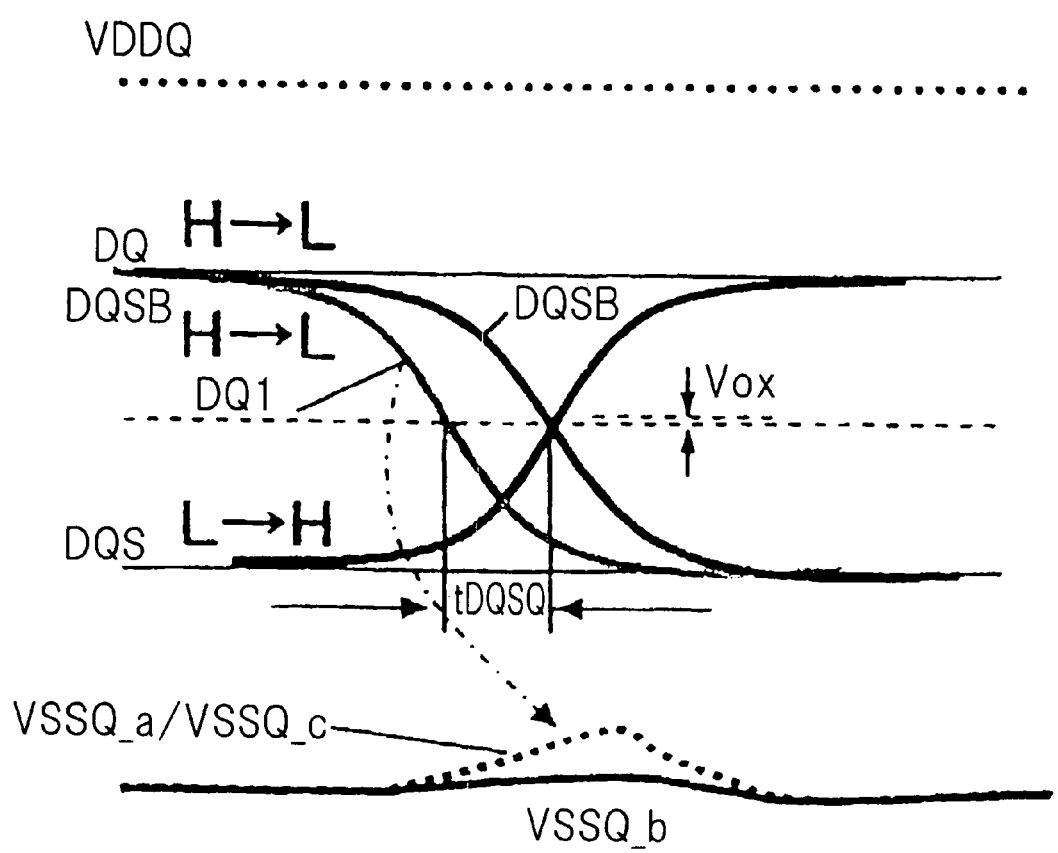
FIG. 10 is a waveform diagram of output signals DQ, DQS, and DQSB in the first exemplary embodiment.

FIG. 10 is a waveform diagram of output signals DQ, DQS, and DQSB in the present exemplary embodiment. Even if power supply noise is generated by the transition (high to low) of output signal DQ (broken line), power supply noise which propagates to output signals DQS and DQSB has already been reduced (solid line). As a result, the rise of power supply voltage VSSQ is decreased and the change in the value of Vox, which is caused by the delay in the fall of output signal DQSB, has also been decreased. It is to be noted that in FIG. 10, VSSQ_a, VSSQ_b, and VSSQ_c are the potentials of VSSQ power supply pads 25b, 25c, and 25d in FIGS. 8 and 9, respectively.

Since the specification of Vox is related to each of output signals DQS and DQSB, DQS output circuit 12 and DQSB output circuit 13 may be separated from each other. This further reduces the influence of power supply noise which propagates to DQS and DQSB.

In the exemplary embodiment, VDDQ power supply pad 24b and VSSQ power supply pad 25c are provided for the combination of DQS output circuit 12 and DQSB output circuit 13. However, when power supply balls VDDQ and VSSQ that are to be connected to these power supply pads are not used in a shared manner, by merely arranging resistor 18 in in-chip output VDDQ power supply wiring 16 and in-chip output VSSQ power supply wiring 17 between VDDQ power supply pad 24b which is provided for DQS output circuit 12, and VDDQ power supply pad 24c which is adjacent to VDDQ power supply pad 24b, and between VSSQ power supply pad 25c, which is provided for DQS output circuit 13, and VSSQ power supply pad 25b which is adjacent to VSSQ power supply pad 25c, it is possible to reduce the propagation of power supply noise to DQS output circuit 12 and DQSB output circuit 13.

Second Exemplary Embodiment

Figure 11:
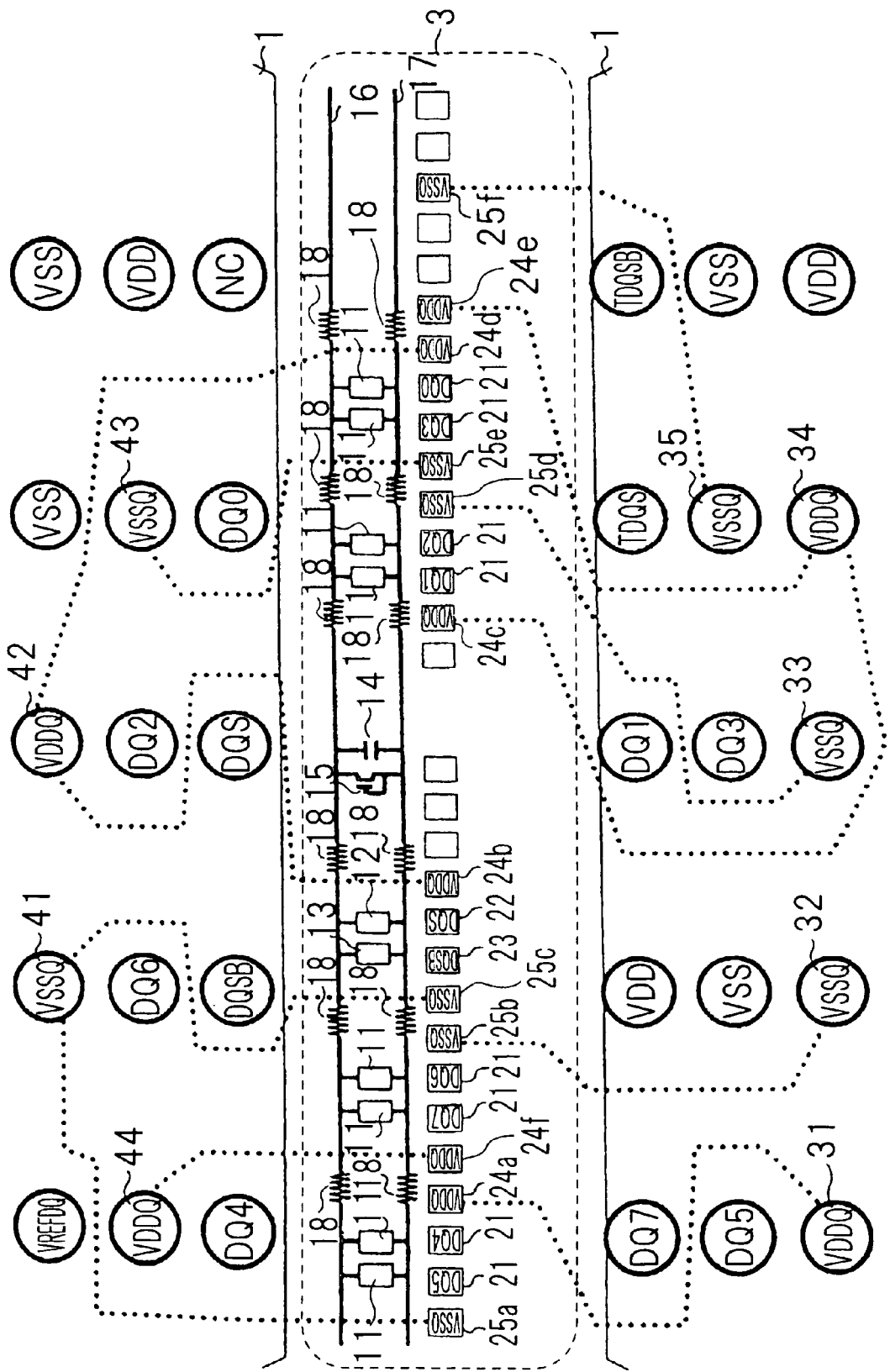
FIG. 11 shows a semiconductor device according to a second exemplary embodiment of the present invention.

FIG. 11 illustrates a semiconductor device according to a second exemplary embodiment of the present invention.

The occurrence of deviation in output signal DQ will affect the AC characteristics as in the case in which the value of Vox of output signals DQS and DQSB changes. The reason why deviation occurs in output signal DQ is the same as the reason why the value of Vox changes due to noise, but the deviation in output signal DQ occurs as a deviation of tDQSQ. The present exemplary embodiment reduces the deviation in output signal DQ as well.

The difference of the present exemplary embodiment from the first exemplary embodiment is that VDDQ and VSSQ power supply pads are provided not only for the combination of the DQS output circuit and the DQSB output circuit, but also for the combination of two adjacent DQ output circuits. Further, the present exemplary embodiment differs from the first exemplary embodiment in that resistor 18 is provided between the respective combinations in in-chip output VDDQ power supply wiring 16 and in-chip output VSSQ power supply wiring 17. As a result, output signal DQ as well will cease to be affected by power supply noise generated by the DQ output circuit of another combination. Further, there will be no delay in the rise or fall of output signal DQ.

In the present exemplary embodiment, the present invention is applied to DQ output circuit 11, DQS output circuit 12, and DQSB output circuit 13. However, the present invention may be applied to DQ output circuit 11 alone in order to eliminate the deviation of tDQSQ of output signal DQ.

Third Exemplary Embodiment

Figure 12:
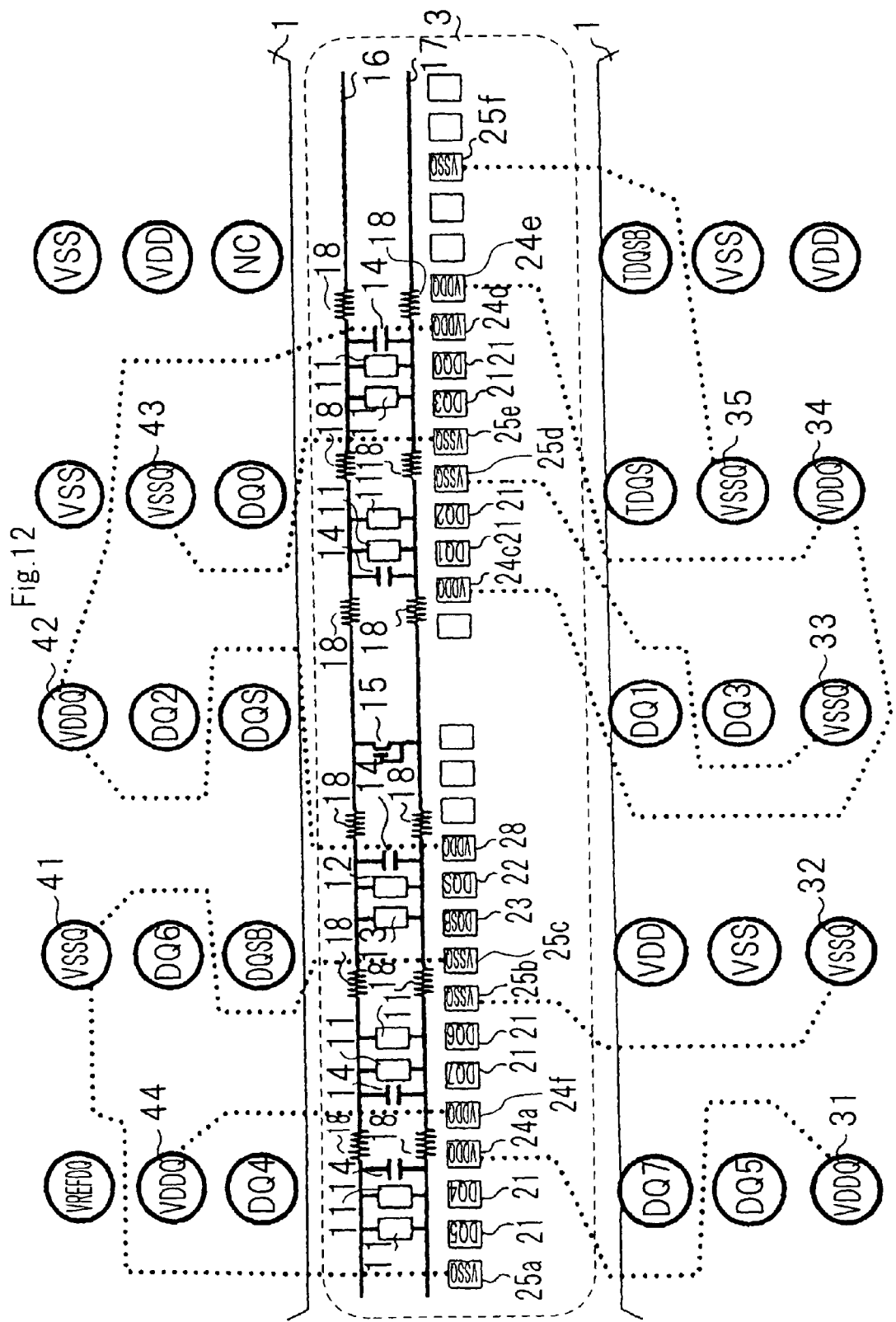
FIG. 12 shows a semiconductor device according to a third exemplary embodiment of the present invention.

FIG. 12 shows a semiconductor device according to a third exemplary embodiment of the present invention.

The difference of the present exemplary embodiment from the second exemplary embodiment is that compensation capacity 14 is provided for each of combination of DQS output circuit 12 and DQSB output circuit 13, and for combination of adjacent two DQ output circuits 11. Resistors 18 disposed in in-chip output VDDQ power supply wiring 16 and in in-chip output VSSQ power supply wiring 17 and compensation capacity 14 in each combination constitute a lowpass filter, which further suppresses power supply noise.

The characteristics of a lowpass filter are represented by the following equation:

$$|Vout|/|Vin|=1/\sqrt{(1+\omega^2 * C^2 * R^2)}: \omega=2\pi f$$
$$\log|Vout|/|Vin| \text{ (dB)}$$

where Vin and Vout are the input and output of the lowpass filter, respectively, C is the capacity of compensation capacity 14, and R is resistance value of resistor 18.

Figure 13:
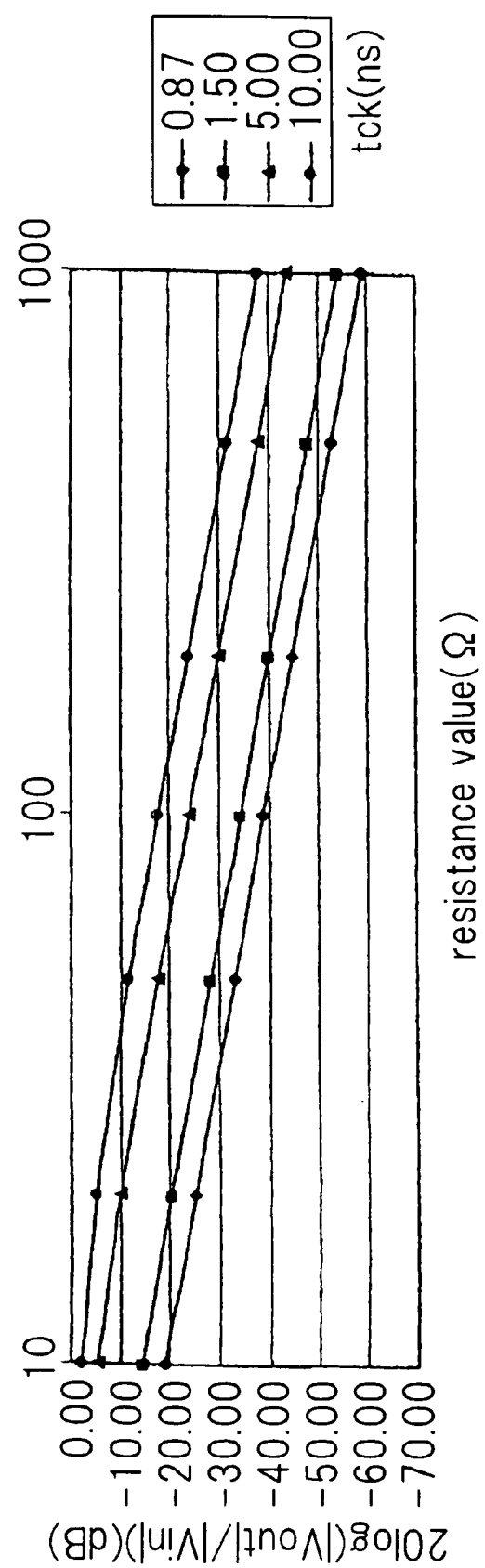
FIG. 13 is a graph showing the characteristic of a lowpass filter versus resistance values.

Since power supply noise is generated due to the switching of output signal DQ, this noise generation is considered to be dependent on the frequency (tCK) of the operation of DQ output circuit 11. FIG. 13 shows the dependency of the characteristics of a lowpass filter on the frequency when the frequency is varied for a case in which compensation capacity 14 per one combination is supposed to be about 121 pF. As can be seen from the figure, power supply noise is reduced by 99% when tCK=0.87 (ns) and the resistance value=100(Ω), and power supply noise is reduced 90% when tCK=10.0 (ns) and the resistance value=100(Ω).

Adjusting the capacity of compensation capacity 14 and the resistance value of resistor 18 makes it possible to cut power supply noise at desired frequencies.

Fourth Exemplary Embodiment

Figure 14:
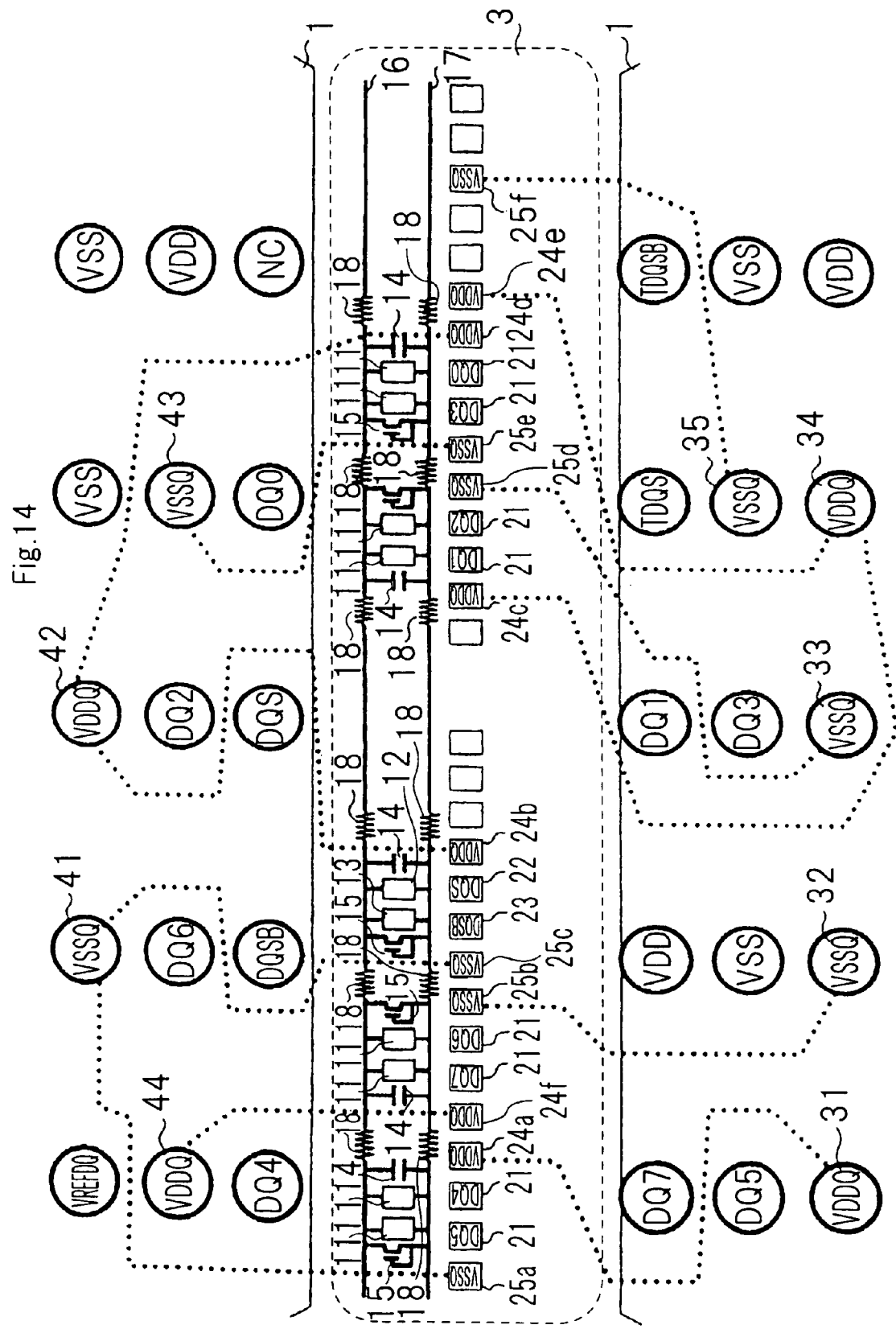
FIG. 14 shows a semiconductor device according to a fourth exemplary embodiment of the present invention.

FIG. 14 illustrates a semiconductor device according to a fourth exemplary embodiment of the present invention.

The difference of the present exemplary embodiment from the third exemplary embodiment is that ESD element 15 is provided for each combination of DQS output circuit 12 and DQSB output circuit 13, and for a combination of two adjacent DQ output circuits 11. This results in the arrangement of ESD element 15 near respective output circuits 11, 12, and 13, thereby achieving excellent ESD resistance.

Fifth Exemplary Embodiment

Figure 15:
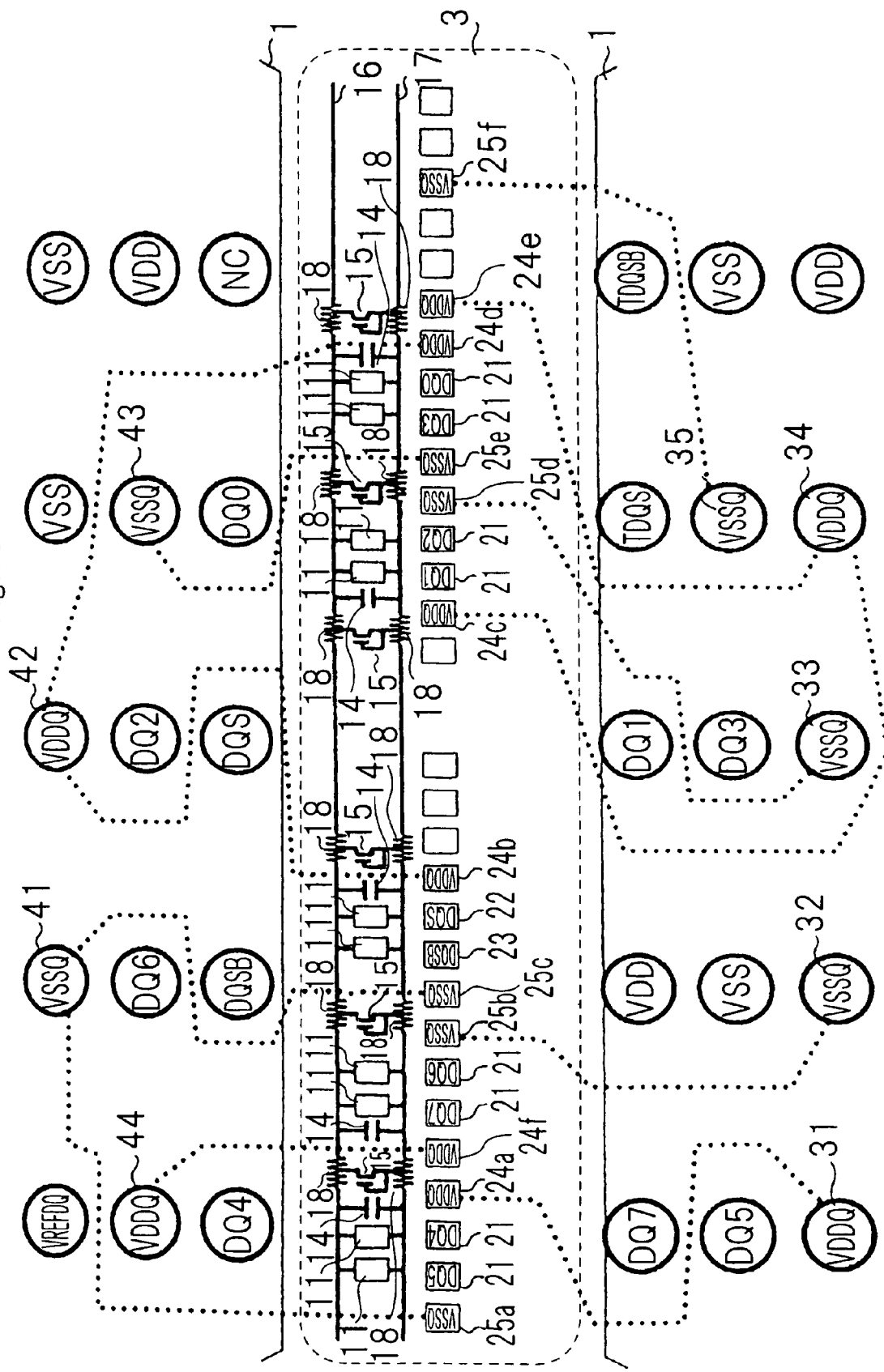
FIG. 15 shows a semiconductor device according to a fifth exemplary embodiment of the present invention.

FIG. 15 illustrates a semiconductor device according to a fifth exemplary embodiment of the present invention.

The difference of the present exemplary embodiment from the fourth exemplary embodiment is that ESD element 15 is provided for resistor 18 between respective combinations. As a result, the number of ESD elements is decreased by one as compared with the fourth exemplary embodiment, which makes it possible to save space in the semiconductor device. Specifically, resistor 18 is made up of two resistance elements each having a resistance value one-half of that (around some tens and hundreds Ω in the first exemplary embodiment) of resistor 18, and ESD element 15 is connected at one end between the resistance elements.

Sixth Exemplary Embodiment

Figure 16:
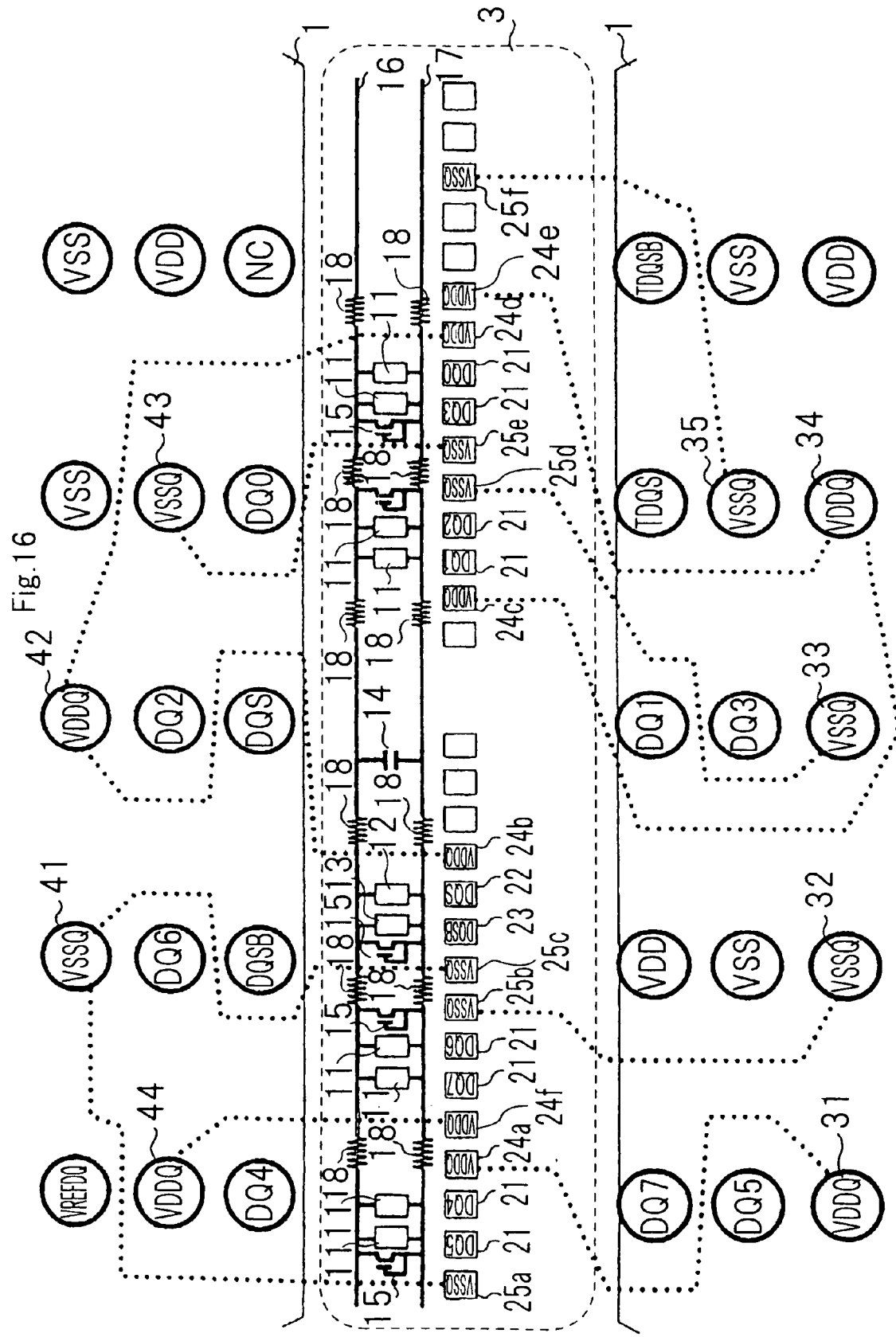
FIG. 16 shows a semiconductor device according to a sixth exemplary embodiment of the present invention.

FIG. 16 shows a semiconductor device according to a sixth exemplary embodiment of the present invention.

The present embodiment is configured such that ESD element 15 is provided for each combination in the second exemplary embodiment.

Other Exemplary Embodiments

In the second to sixth exemplary embodiments, the number of output circuits (DQ output circuit 11, DQS output circuit 12, and DQSB output circuit 13) in each combination may be one. Further, it may be any number more than two. Furthermore, DQS output circuit 12 and DQSB output circuit 13, which have a Vox specification, may be separated.

In the second to sixth exemplary embodiments, if power supply balls VDDQ and VSSQ that are to be connected with power supply pads VDDQ and VSSQ in each combination are not shared by the power supply pads VDDQ and VSSQ and other power supply pads VDDQ and VSSQ, it is possible to reduce the propagation of power supply noise simply by disposing a resistor at some middle point in power supply wirings VDDQ and VSSQ so as to separate each combination.

These configurations may be employed taking into consideration the reduction of power supply noise, chip size, and substrate layout, which is intended.

The external power supply terminal is not limited to a power supply ball, but may be any external power supply terminal including those having different shapes, which is provided in a semiconductor chip mounted on a substrate and which serves as an output terminal of the semiconductor device on the substrate.

The present invention is applicable to a substrate to which a multilayer wiring technology is applied.

The packages of the exemplary embodiments described above, are a face-down type package wherein the surface of the center pad (the surface of the power supply pad) and the surface of the power supply ball are flush with each other, that is, the activated surface of the semiconductor chip and the surface of the power supply ball are flush with each other. The surface of the center pad and the surface of the power supply ball are not limited to this configuration, but may be in any different planes.

The present invention can be applied to a type of face-up package in which the activated surface of semiconductor chip and the surface of power supply ball are different planes.

While preferred embodiments of the present invention have been described using specific terms, such description is for illustrative purposes only, and it is to be understood that changes and variations may be made without departing from the spirit or scope of the following claims.

What is claimed is:

1. A device comprising:
    first and second power supply pads, each supplied with a first power supply voltage;
    first and second circuits;
    a first power supply wiring interconnecting the first power supply pad to the first circuit;
    a second power supply wiring interconnecting the second power supply pad to the second circuit; and
    a first resistor interconnecting the first power supply wiring and the second power supply wiring.

2. The device as claimed in claim 1, further comprising:
    third and fourth power supply pads, each supplied with a second power supply voltage different from the first power supply voltage;
    a third power supply wiring interconnecting the third power supply pad to the first circuit;
    a fourth power supply wiring interconnecting the fourth power supply pad to the second circuit; and
    a second resistor interconnecting the third power supply wiring and the fourth power supply wiring.

3. The device as claimed in claim 2, further comprising first and second signal pads, wherein the first circuit comprises first and second transistors coupled in series between the first and third power supply line, the first and second transistors are coupled to each other at an output node of the first circuit, the second circuit comprises third and fourth transistors coupled in series between the second and fourth power supply line, the third and fourth transistors are coupled to each other at an output node of the second circuit, and the output nodes of the first and second circuits are coupled respectively to the first and second signal pads.

4. The device as claimed in claim 2, further comprising first, second and third signal pads, wherein the first circuit comprises first and second transistors coupled in series between the first and third power supply line, the first and second transistors are coupled to each other at an output node of the first circuit, the second circuit comprises third and fourth transistors coupled in series between the second and fourth power supply line, the third and fourth transistors are coupled to each other at an output node of the second circuit, the third circuit comprises fifth and sixth transistors coupled in series between the third and sixth power supply line, the fifth and sixth transistors are coupled to each other at an output node of the third circuit, and the output nodes of the first, second and third circuits are coupled respectively to the first, second and third signal pads.

5. The device as claimed in claim 1, further comprising:
    a third power supply pad supplied with the first power supply voltage;
    a third circuit;
    a third power supply wiring interconnecting the third power supply pad to the third circuit; and
    a second resistor interconnecting the third power supply wiring and the first power supply wiring.

6. The device as claimed in claim 5, further comprising a fourth circuit, and wherein the first power supply wiring interconnects the first power supply pad to the fourth circuit.

7. The device as claimed in claim 6, further comprising first, second, third and fourth signal pads, wherein the first circuit includes an output node coupled to the first signal pad, the second circuit includes an output node coupled to the second signal pad, the third circuit includes an output node coupled to the third signal pad and the fourth circuit includes an output node coupled to the fourth signal pad.

8. The device as claimed in claim 5, further comprising first, second and third signal pads, wherein the first circuit includes an output node coupled to the first signal pad, the second circuit includes an output node coupled to the second signal pad and the third circuit includes an output node coupled to the third signal pad.

9. The device as claimed in claim 1, further comprising:
    a semiconductor chip that comprises the first and the second power supply pads, the first and the second circuits, the first and the second power supply wirings, and the first resistor; and
    a substrate on which the semiconductor chip is mounted, the substrate comprising,
        first and second power supply terminals provided separately to each other, each of the first and second power supply terminals supplied with the first power supply voltage;
        a first power supply wiring elongated from the first power supply terminal to the first power supply pad of the first semiconductor chip; and
        a second power supply wiring elongated from the second power supply terminal to the second power supply pad of the first semiconductor chip.

10. The device as claimed in claim 9, wherein the substrate includes an opening, the semiconductor chip is mounted on the substrate such that the first and second power supply pads are exposed by the opening of the substrate, the first and second power supply terminals of the substrate are disposed on the substrate on an opposite side to each other with respect to the opening.

11. The device as claimed in claim 1, further comprising first and second signal pads, wherein the first circuit includes an output node coupled to the first signal pad and the second circuit includes an output node coupled to the second signal pad.

12. The device as claimed in claim 1, wherein the first resistor comprises a tungsten resistor.

13. The device as claimed in claim 1, wherein the first resistor represents a resistance value between some tens and hundreds of ohms.

14. A device comprising:
    first and second power supply pads, each supplied with a first power supply voltage;
    first and second circuits;
    a first power supply wiring interconnecting the first power supply pad to the first circuit without an intervention of any resistors in series between the first power supply pad and the first circuit;
    a second power supply wiring interconnecting the second power supply pad directly to the second circuit without an intervention of any resistors in series between the second power supply pad and the second circuit; and
    a first resistor interconnecting the first power supply wiring and the second power supply wiring.

15. The device as claimed in claim 14, further comprising first and second signal pads, wherein the first circuit includes an output node coupled to the first signal pad and the second circuit includes an output node coupled to the second signal pad.

16. The device as claimed in claim 14, further comprising:
a third power supply pad supplied with the first power supply voltage;
a third circuit;
a third power supply wiring interconnecting the third power supply pad to the third circuit without an intervention of any resistors in series between the third power supply pad and the third circuit; and
a second resistor interconnecting the third power supply wiring and the first power supply wiring.

17. The device as claimed in claim 16, further comprising first, second and third signal pads, wherein the first circuit includes an output node coupled to the first signal pad, the second circuit includes an output node coupled to the second signal pad and the third circuit includes an output node coupled to the third signal pad.

18. The device as claimed in claim 16, further comprising a fourth circuit, and wherein the first power supply wiring interconnects the first power supply pad to the fourth circuit without an intervention of any resistors in series between the first power supply pad and the fourth circuit.

19. The device as claimed in claim 18, further comprising first, second, third and fourth signal pads, wherein the first circuit includes an output node coupled to the first signal pad, the second circuit includes an output node coupled to the second signal pad, the third circuit includes an output node coupled to the third signal pad and the fourth circuit includes an output node coupled to the fourth signal pad.

20. The device as claimed in claim 14, wherein the first resistor comprises a tungsten resistor.

21. The device as claimed in claim 14, wherein the first resistor represents a resistance value between some tens and hundreds of ohms.

22. The device as claimed in claim 14, further comprising:
a semiconductor chip that comprises the first and the second power supply pads, the first and the second circuits, the first and the second power supply lines, and the first resistor; and
a substrate on which the semiconductor chip is mounted, the substrate comprising:
first and second power supply terminals provided separately to each other, each of the first and second power supply terminals supplied with the first power supply voltage;
a first power supply wiring elongated from the first power supply terminal to the first power supply pad of the first semiconductor chip; and
a second power supply wiring elongated from the second power supply terminal to the second power supply pad of the first semiconductor chip.

* * * * *